United States Patent [19]

Ehlers et al.

[11] 3,723,703
[45] Mar. 27, 1973

[54] LASER ENERGIZED PLASMA SOURCE

[75] Inventors: Kenneth W. Ehlers, Alamo, Calif.; Ian G. Brown, Munich, Germany; Alan F. Lietzke, Oakland, Calif.

[73] Assignee: The United States of America as represented by the United States Atomic Energy Commission

[22] Filed: Feb. 8, 1971

[21] Appl. No.: 113,522

[52] U.S. Cl. .................................176/1, 219/121 L
[51] Int. Cl. ............................................B23k 27/00
[58] Field of Search .........219/121 L, 121 EB; 176/1; 250/222 PC, 211 J

[56] References Cited

UNITED STATES PATENTS 3,378,446  4/1968  Whittlesey........................219/121 L

OTHER PUBLICATIONS

"The Review of Scientific Instruments," Vol. 39, No. 11 November, 1968 pp. 1697–1700.

Primary Examiner—J. V. Truhe
Assistant Examiner—George A. Montanye
Attorney—Roland A. Anderson

[57] ABSTRACT

An apparatus for creating and heating a plasma within a magnetic field. A solid pellet of material from which the plasma is to be made, such as a frozen pellet of hydrogen, is dropped into a magnetic containment field. A high power laser directed through the field is activated to highly energize the hydrogen. The laser beam is concentrated at a focal point so that maximum energy is transferred to the pellet. The pellet falls within a steady-state laser beam directed vertically through the focal point. The laser is pumped and fired when the pellet is in the focal point by signals from photomultipliers which detect the presence of a pellet just above the focal point.

7 Claims, 2 Drawing Figures

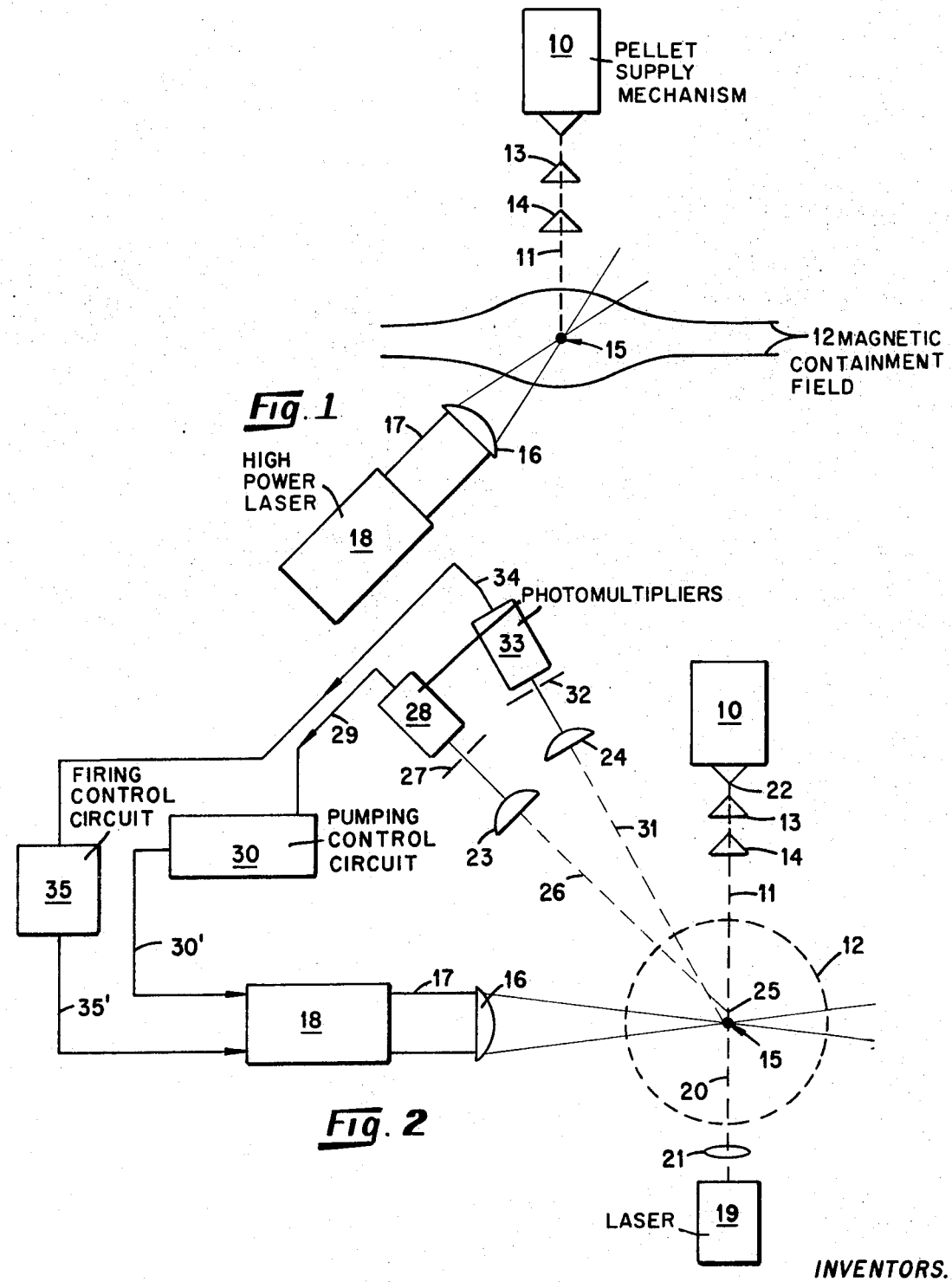

LASER ENERGIZED PLASMA SOURCE

BACKGROUND OF THE INVENTION

The invention described herein was made in the course of, or under, Contract No. W-7405-ENG-48, with the United State Atomic Energy Commission.

This invention relates generally to controlled thermonuclear apparatus utilizing a laser for energizing a plasma in a containing magnetic field, and more particularly to such an apparatus wherein the laser is timely pumped and fired in response to the fall of a pellet to be energized.

Various apparatus and methods for dropping hydrogen pellets or the like and detecting light scattered from the pellet for triggering a laser at an exact point of the pellets fall is known in the art as exemplified by the article published in the Review of Scientific Instruments, Vol. 39, No. 11, November, 1968, pages 1697–1700; and Physics Letters, Vol. 25A, No. 6, Sept. 25, 1967, pages 486 and 487. These prior known devices and methods have been complicated and expensive, and thus a need has been known in the art to provide a simple yet effective means and method for timely triggering a laser for creating and heating a plasma.

SUMMARY OF THE INVENTION

The present invention fills the need in the art to provide a simple and effective plasma generator wherein solid pellets of hydrogen — or other like material — are dropped into a magnetic containment field along a vertically directed d.c. laser beam. Light scattered from a pellet is detected, pumping and triggering a high power laser which has a focal point coinciding with the d.c. laser beam. The inventive detection and firing system has the capability of operating over a long distance during the fall of the pellet, i.e., from the outside of the magnetic field into the center of the field.

Therefore, it is an object of this invention to provide a laser energized plasma source.

A further object of the invention is to provide a laser energized plasma source wherein a pellet of suitable material is dropped into a magnetic containment field along a vertically directed laser beam and high energized by a high power laser which is pumped and triggered in response to the presence of the pellet just above a focal point coinciding with the vertically directed laser beam.

Another object of the invention is to provide a controlled thermonuclear energy apparatus utilizing a laser for energizing a plasma in a containing magnetic field.

Another object of the invention is to provide such an apparatus wherein the laser is pumped and triggered in response to detection of light scattered from the fall of a pellet, such as solid hydrogen, to be energized by the laser.

Another object of the invention is to provide such an apparatus wherein the detecting means has the capability of operating over long distances during the fall of the pellet, i.e., from outside the magnetic field into the center of the field.

Other objects of the invention will become readily apparent from the following description and accompanying drawings.

BRIEF DESCRIPTION OF THE DRAWINGS

FIG. 1 is a schematic view illustrating a system wherein solid pellets of hydrogen or the like are dropped into a magnetic containment field and energized by a high power laser; and FIG. 2 is a schematic view of an embodiment of the detecting and firing apparatus for the FIG. 1 type system in accordance with the invention.

DESCRIPTION OF THE INVENTION

It is the purpose of the present invention to provide an apparatus to energize a solid pellet of hydrogen, or like material, with a laser focussed beam. The pellet is dropped into a magnetic containment field and energized as it passes through a central point within the field. The laser beam is passed through a lens system disposed outside the field so that it has a focal point lying at the central point within the field. It is then necessary to fire the laser at the moment the pellet falls through the focal point.

An embodiment of such an apparatus is illustrated in FIG. 1 and comprises a hydrogen pellet supply mechanism 10 which selectively drops solid hydrogen pellets to be energized from the lower end thereof by mechanism not shown, the pellets falling by gravitational force along line 11 into a magnetic containment field indicated at 12, produced by coil means not shown. A pair of collimators 13 and 14 are positioned along the pellet fall line 11 which function to eliminate any pellets not exactly aligned with a focal point 15 lying at the central point within the magnetic field 12, focal point 15 being that of a lens system, or suitable optical or other means, indicated at 16 positioned to direct a laser beam indicated at 17 from a high power laser 18 onto the center of the magnetic field 12. It is thus readily seen that when a pellet from supply mechanism 10 is dropped along line 11 through collimators 13 and 14 passes through the focal point 15 located centrally within magnetic containment field 12 whereupon it is energized by the high power laser beam 17 passed through an adjustable optical or lens system 16 from laser 18.

The inventive apparatus for detecting the fall of the hydrogen pellet and timely firing the laser 18 is illustrated in the FIG. 2 embodiment which detects the presence of a pellet just above the focal point 15 to provide time for pumping the laser so that it can be fired at just the moment the pellet passes through the focal point. Typically, by way of example, the focal point has a 100 micron diameter while the pellet has a 50 micron diameter, thus very accurate control is necessary. FIG. 2 illustrates a cross-sectional view through the center of the magnetic containment field 12.

A steady-state laser 19 projects a beam 20 through an adjustable lens or optical means 21 in a precisely vertical direction which passes through focal point 15, collimators 13 and 14, and into an opening 22 of the pellet supply mechanism 10 from which the pellets fall along gravity line 11. As a falling pellet is illuminated by steady-state laser 19, some light from the laser 19 is scattered off the pellet and through lens or optical means indicated at 23 and 24. When the pellet is just above the focal point 15, as indicated at 25, the scattered light from the pellet, indicated by beam 26, passes through lens means 23, through a slit or collimator 27, and is detected by a photomultiplier tube 28 or other suitable detecting means. The resulting signal from photomultiplier 28, indicated at 29, triggers a pumping control circuit 30 which produces a signal 30' for activating laser 18. When the pellet reaches the focal point 15 the scattered light from the pellet, indicated by beam 31, passes through lens means 24, through a second slit or collimators 32 and is detected by a photomultiplier tube 33 or other suitable means, the signal therefrom indicated at 34 triggers a firing control circuit 35 producing a signal 35' which fires the laser 18 producing the output beam 17 which passes through lens system 16 and strikes the pellet at the focal point 15, transferring to the pellet the maximum energy thereby causing thermonuclear burn of the pellet.

It is thus apparent that alignment of the light beam 20 of steady-state laser 19 along the gravitational fall line 11 of the pellet from supply mechanism 10 through focal point 15 must be accurately established, as well as establishing the focal point of the lens system 16 so that the maximum energy from beam 17 of high power laser 18 is transferred to the falling pellet as it passes through the focal point 15.

A method which accurately positions the vertical beam 20 on the gravitational fall line 11 of a pellet is to position above the beam 20 flat parallel glass plates which have leveling adjustments in two planes and position thereon a container of castor oil whereby a pair of reflected beams as produced by the beam 20, one being by the glass-air interface beneath the glass plates and the second being by the oil-air interface. Then by adjusting the level of the glass plates and the level of the laser 19 which is positioned on a level flat support, these reflected beams are both adjusted so as to pinpoint back onto the beam 20. This is accomplished by positioning a plate with a small hole adjacent the laser 19 through which the beam 20 passes, the reflected beams falling originally on the plate and then adjusted so as to reflect directly into the small hole therein, whereby the beam 20 is aligned vertically along the gravity fall line 11 of a pellet to be energized.

With the steady-state laser beam 20 now exactly vertically aligned with the gravity fall line of a pellet, the next step is to determine the focal point 15 of lens or optics system 16 so that the beam 17 from high power laser 18 strikes a falling pellet at the focal point located at the center of the magnetic field 12. This is accomplished by aligning the beam 17 at approximately the center of the field 12, positioning a movable foil, such as stainless steel at a 45° angle with respect to the beam 17 and then pulsing laser 18 so as to burn a hole in the foil. The foil is moved slightly to present a new surface and the lens system 16 adjusted after which the laser is again fired burning another hole in the foil. This sequence of minor adjustments is continued until the smallest hole is burned in the foil indicating the focal point of the lens system 16 on gravity fall line 11 and thus the point of greatest concentration of the energy of laser beam 17.

Having now established the focal point 15 then alignment of laser 19 so that beam 20 passes through the focal point 15 is accomplished by maintaining the foil with the desired hole therein located at the focal point and moving the laser 19 about is flat, level support and adjusting the lens 21 until beam 20 passes exactly through the hole in the foil, and thus the focal point 15.

Passing of the beam 20 from laser 19 through the hole in the foil located at focal point 15 scatters light whereby photomultiplier 33 can be adjusted so as to fire the laser 18 when a pellet falls into the focal point. The photomultiplier 28 is then adjusted so as to detect the pellet at a desired point 25 just above the focal point for pumping laser 18 in preparation of firing same.

With the system aligned as above described, the foil is removed and the system as illustrated in FIG. 2 is ready for operation.

While the embodiment illustrated shows the laser beams 17 and 20 as being sent directly from the respective lasers 18 and 19, the beams may be reflected through mirror or optic arrangements as known in the art, so that the lasers can be located in the space and support requirement of various applications of the inventive system.

It has thus been shown that the present invention provides an effective apparatus for activating and firing a high power laser responsive to the fall of a pellet to be energized by the laser, thereby greatly advancing the state of the art.

While a particular embodiment of the inventive concept has been illustrated and described, modifications will become apparent to those skilled in the art, and it is intended to cover in the appended claims all such modifications as come within the spirit and scope of the invention.

What we claim is:

1. A system for creating and heating a plasma within a magnetic field comprising: means for forming a magnetic field, means for dropping a pellet to be energized into said magnetic field, laser means for producing a beam of laser light when energized, means positioned intermediate said laser means and said magnetic field having a focal point substantially centrally located within said field for passing an output beam from said laser means and concentrating the beam at said focal point so that maximum energy is transferred from the beam to an associated pellet to be energized when such an associated pellet is located at said focal point, means positioned intermediate said focal point and said pellet dropping means for eliminating any associated pellets from said pellet dropping means not exactly aligned with said focal point, means in alignment with said focal point and said pellet dropping means for illuminating an entire line of fall of an associated pellet to be energized such that light is scattered from such an associated pellet along the entire line of fall, means for detecting light scattered from an associated pellet when such an associated pellet is at a point above or at said focal point, means responsive to said detecting means for activating said laser means upon detection of light scattered from such an associated pellet at the point above said focal point, and means responsive to said detecting means for firing said laser means upon detection of light scattered from such an associated pellet at said focal point thereby energizing such an associated pellet located at said focal point.

2. The system defined in claim 1, wherein said pellet eliminating means comprises at least one collimating means.

3. The system defined in claim 1, wherein said illuminating means comprises second laser means for producing an output beam, and means for directing an output beam from said second laser means through said focal point, said pellet eliminating means, and to said pellet dropping means illuminating the line of fall of an associated pellet from said pellet dropping means through said focal point.

4. The system defined in claim 3, wherein said detecting means comprises photomultiplier means for producing output signals when activated by light scattered from said pellet, said activating means and said firing means being responsive to output signals from said photomultiplier means.

5. The system defined in claim 4, wherein said photomultiplier means comprises a pair of photomultiplier tubes, wherein said activating means includes a pumping control circuit, an output signal from one of said photomultiplier tubes activating said pumping control circuit which activates said first-mentioned laser means, and wherein said firing means comprises a firing control circuit, an output signal from the other of said photomultiplier tubes activating said firing control circuit which fires said first-mentioned laser means.

6. The system defined in claim 1, wherein said detecting means comprises a pair of photomultiplier tubes, wherein said activating means comprises a laser pumping control circuit operatively connected intermediate one of said photomultiplier tubes and said laser means, and wherein said firing means comprises a laser firing control circuit operatively connected intermediate the other of said photomultiplier tubes being responsive to light scattered from an associated falling pellet at said point above said focal point for activating said laser pumping control circuit thereby activating said laser means, said other of said photomultiplier tubes being responsive to light scattered from an associated falling pellet at said focal point for activating said laser firing control circuit thereby firing said laser means when such an associated pellet is located at said focal point.

7. The system defined in claim 6, wherein lens means and slot defining means are positioned intermediate each of said pair of photomultiplier tubes and the point of fall of an associated pellet being detected thereby for passing scattered light from such an associated pellet to said photomultiplier tubes.

* * * * *